United States Patent [19]

Guillard

[11] 4,007,559
[45] Feb. 15, 1977

[54] MACHINE FOR REPRODUCING AN ARTICLE FROM A PATTERN

[75] Inventor: Dzidris Guillard, Paris, France
[73] Assignee: Societe C.M.V., Puteaux, France
[22] Filed: Oct. 29, 1974
[21] Appl. No.: 518,957

[30] Foreign Application Priority Data

Oct. 26, 1973 France .......................... 73.38221

[52] U.S. Cl. ........................... 51/101 LG; 90/13.4
[51] Int. Cl.² ....................................... B24B 17/02
[58] Field of Search .......... 51/35, 50 PC, 100, 101, 51/93, 284; 82/14 A, 14 C; 90/13.4

[56] References Cited

UNITED STATES PATENTS

| | | | |
|---|---|---|---|
| 2,330,566 | 9/1943 | Edmonds | 90/13.4 |
| 2,364,322 | 12/1944 | Shultz | 51/101 R |
| 2,445,971 | 7/1948 | Rosen | 51/101 R |
| 3,040,482 | 6/1962 | Schafranik | 51/101 R |
| 3,041,789 | 7/1962 | Cretin-Maitenaz | 51/101 R |
| 3,239,967 | 3/1966 | Volk | 51/100 R |
| 3,589,075 | 6/1971 | Carlson | 51/101 R |
| 3,815,288 | 6/1974 | Wilson | 51/101 R |

*Primary Examiner*—Harold D. Whitehead
*Assistant Examiner*—Nicholas P. Godici
*Attorney, Agent, or Firm*—Norman Lettvin; Gerald S. Geren

[57] ABSTRACT

A machine for reproducing an article from a pattern, wherein the pattern and the article are mounted respectively on parallel supporting shafts and driven at the same speed of rotation, and are in contact with a feeler and a tool, respectively. The two shafts are mounted on a table designed to make two perpendicular movements, namely an advance movement in a direction perpendicular to the supporting shafts and a contact movement in a direction parallel to those shafts. The invention is applicable in particular to the roughing out of toric lenses.

3 Claims, 4 Drawing Figures

MACHINE FOR REPRODUCING AN ARTICLE FROM A PATTERN

BACKGROUND OF THE INVENTION

This invention relates to machines for reproducing an article from a pattern, and in particular to machines for roughing out lenses having toroidal surfaces.

SUMMARY OF THE INVENTION

In this type of machine, the pattern and the workpiece are mounted on parallel supporting shafts driven at the same rotational speed by drive means and are in contact respectively with a feeler and a tool in a constant space relationship equal to the interval between the pattern and the workpiece.

The machine according to the invention is distinguished by the fact that the feeler and the tool are fixed and by the fact that the two supporting shafts are mounted on a table capable of making two perpendicular movements, namely an advance movement in a direction perpendicular to the supporting shafts and a contact movement in a direction parallel to the supporting shafts.

In one preferred embodiment, the direction of the advance movement is in the plane formed by the two supporting shafts.

The machine according to the invention is particularly suitable for producing blanks for toric lenses and will be described in more detail in the following with reference to the accompanying drawings.

DESCRIPTION OF THE PREFERRED EMBODIMENTS

Figure 1:
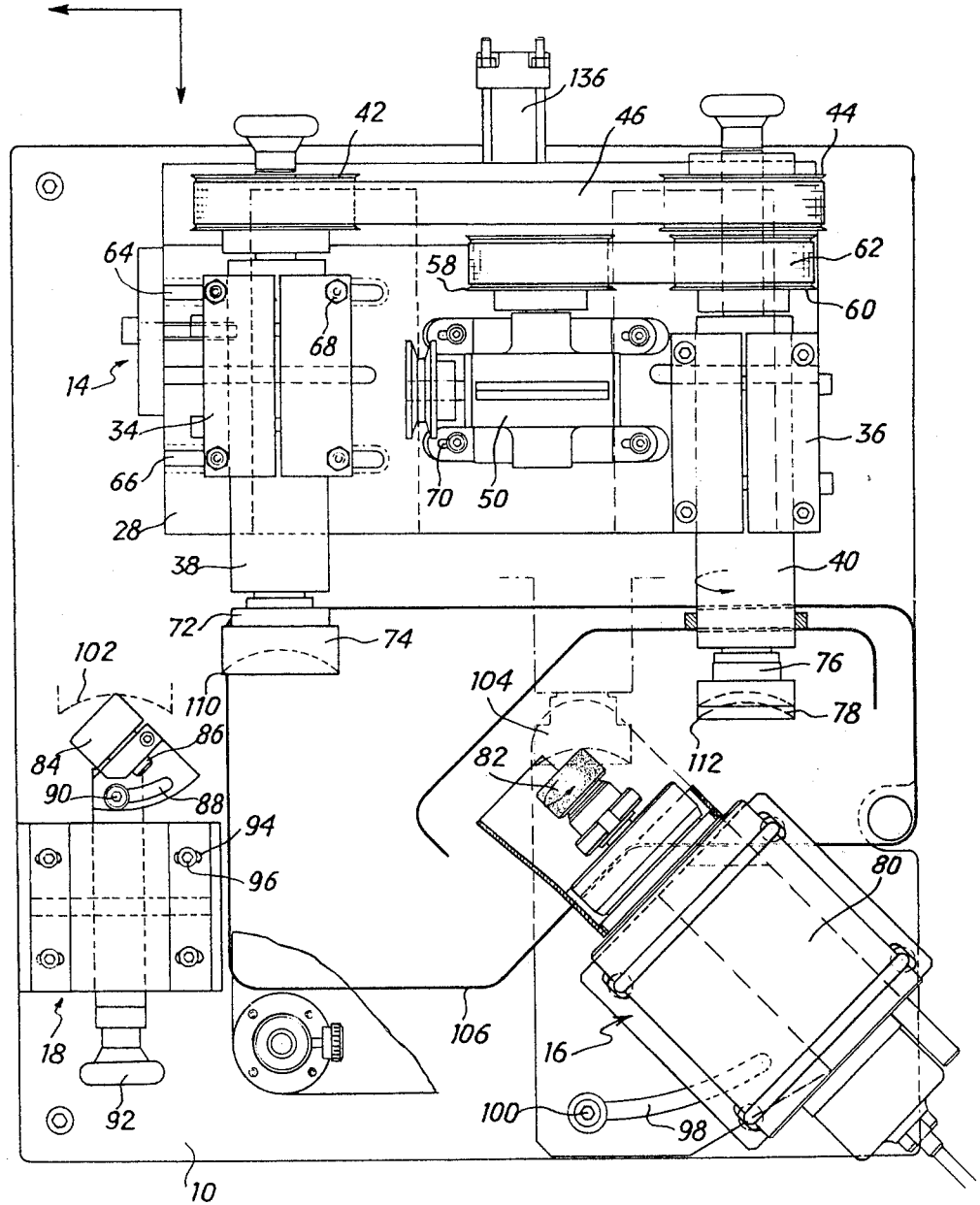
FIG. 1 is a plan view of one particular embodiment of the machine according to the invention in the form in which it is used for producing a blank for a toric lens.
Figure 2:
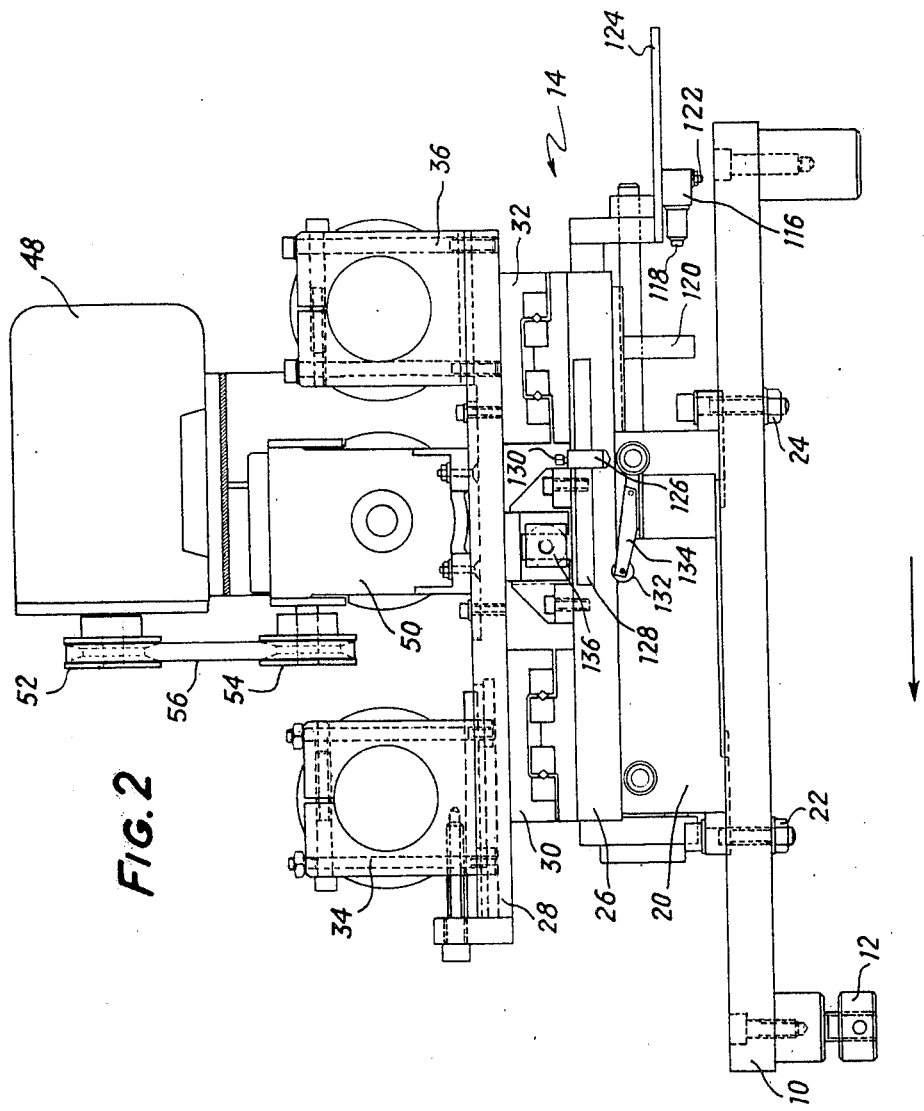
FIG. 2 is a side elevation of the embodiment illustrated in FIG. 1.

The machine illustrated in FIGS. 1 and 2 comprises a base 10 mounted on vertically adjustable feet, such as 12 (FIG. 2), to enable the machine to be adjusted in regard to its horizontal position.

This base 10 carries a table designed to make two perpendicular movements, denoted generally by the reference 14, a tool holder 16 and a holder 18 for the feeler.

The table 14 comprises a section 20 fixed to the base 10 by bolts, such as 22 and 24, and a displaceable section 26 sliding relative to the section 20 in the advance direction through suitable guide means (not shown). A movable plate 28 is mounted on the displaceable section 26, sliding in a contact direction perpendicular to the advance direction by means of two crossed roller guide assemblies 30 and 32 (FIG. 2).

Two bearings 34 and 36 are mounted on the plate 28. Two supporting shafts 38 and 40 are designed to be mounted in these bearings 34 and 36. These two shafts are driven at the same rotational speed through two pulleys 42 and 44 of the same diameter and a toothed gear belt 46. The shaft 40 is rotated by means of a motor 48 (shown only in FIG. 1) and a reduction gear 50.

The reduction gear 50 is driven through pulleys 52 and 54 and a belt 56. This reduction gear drives the shaft 40 through two pulleys 58 and 60 and a belt 62.

The belt 46 can be kept under tension by adjusting the position of the bearing 34 relative to the plate 28. To this end, the plate 28 comprises two elongated slots 64 and 66 which may cooperate with the four fixing bolts, such as 68, of the bearing 34. The belt 62 may also be kept under tension by adjusting the position of the reduction gear 50 on the plate 28. To this end, the fixing lugs of the reduction gear comprise elongated slots, such as 70.

At one of its ends, the shaft 38 comprises a support 72 to which the pattern 74 to be reproduced is fixed. At one of its ends, the shaft 40 comprises a support 76 to which the lens 78 to be roughed out is fixed. The lens may be conveniently fixed to a support with cement or a suitable pin.

The tool holder 16 comprises a motor 80 rotating a tool, namely a circular grinding wheel 82. The holder 18 for the feeler comprises a circular feeler 84 identical in shape and diameter with the grinding wheel 82. The feeler 84 rotates freely about its axis 86 which is parallel to the axis of rotation of the grinding wheel 82. The feeler 84 may be directed by means of an arcuate slot 88 which cooperates with a bolt 90. It can also be longitudinally adjusted by means of a hand wheel 92 and transversely adjusted by means of four elongated slots, such as 94, cooperating with bolts such as 96.

The tool holder 16 may be directed through an arcuate slot 98 associated with a bolt 100.

By virtue of the aforementioned adjustments, it is possible to vary the direction of the grinding wheel and of the feeler, the interval between them and the extent to which they are staggered in the contact direction, in such a way that the feeler and the grinding wheel come into contact with the pattern 74 and the lens 78, respectively, during operation of the machine.

During operation, the feeler 84 remains in contact with the pattern 74, whilst the lens 78 remains in contact with the grinding wheel, being roughed out from the outer edge to its centre. On completion of roughing out, the pattern 74 and the lens 78 respectively occupy the positions 102 and 104 (shown in dotted lines in FIG. 1). In these positions, the feeler and the grinding wheel are in contact with the centre of the pattern and with the centre of the lens, respectively.

In order to facilitate roughing out of the lens, it is sprinkled with a cooling liquid by means of a spray (not shown). This liquid is collected in a container 106 to be recycled.

Figure 3:
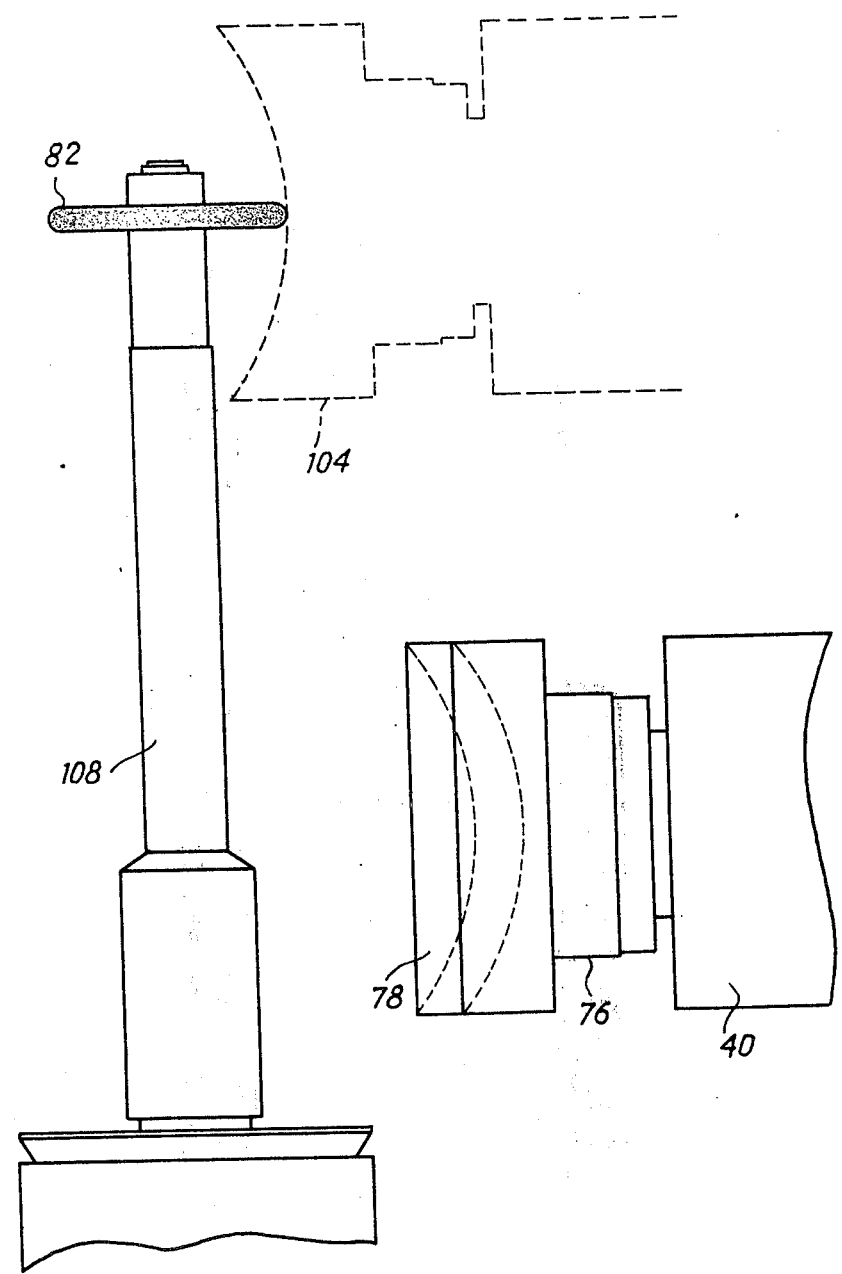
FIG. 3 is a partial plan view of the machine according to the invention showing a preferred arrangement of the tool relative to the glass workpiece.

FIG. 3 shows a modification of the machine, in which the grinding wheel 82 is a disc rotated about a spindle 108 which is perpendicular to the shaft 40. In this case, the feeler 84 is identical in shape and its axis of rotation is also perpendicular to the supporting shaft 38.

The operation of the machine according to the invention will be described with particular reference to FIG. 4 which illustrates the electropneumatic control system of the machine according to the invention.

The machine according to the invention operates in cycles, each cycle allowing the roughing out of a different lens.

The machine is in the position illustrated in FIGS. 1 and 2 at the beginning of each cycle which comprises the following successive phases:

rapid advance movement until the edge 110 of the pattern and the edge 112 of the lens arrive opposite the feeler and the grinding wheel, respectively;

a combined movement of gradual advance and contact, allowing the lens to be progressively roughed out from its edge 112 to its centre (the lens and the pattern then occupy positions 104 and 102, respectively); and return to the starting position comprising the movements of contact and advance, but in the opposite direction.

The rapid advance movement of the unit is produced by a double-acting jack 114 (shown in FIG. 4 only), whilst the gradual advance movement is produced by the same jack 114 braked by an opposing hydraulic damper (not shown in the Figures).

The displaceable section 26 of the advance unit comprises a stop 116 which is equipped with a contactor 118, can be adjusted in regard to its position and is designed to cooperate with a stop 120 integral with the hydraulic damper (FIG. 2).

Under the action of the jack 114, the displaceable section 26 is displaced rapidly relative to the fixed section 20 until the stops 116 and 120 come into contact, thereby actuating the contactor 118. The section 26 continues to advance, but more slowly under the effect of the braking force applied by the hydraulic damper. The contactor 118 then initiates the contact movement.

The position of the stop 116 can be adjusted in relation to the displaceable section 26 by means of a fixing bolt 122 which cooperates with a guide surface 124.

The displaceable section 26 also comprises a punch 126 whose position on a bar 128 can be adjusted by means of a bolt 130.

The punch 126 is designed to cooperate with a roller 132 mounted for rotation at the end of a movable arm 134 so as to initiate the return movements on completion of the roughing-out operation through an electrical contact.

The contact movement is produced by a double acting jack 136 which brings the grinding wheel into contact with the lens and the feeler into contact with the pattern.

Figure 4:
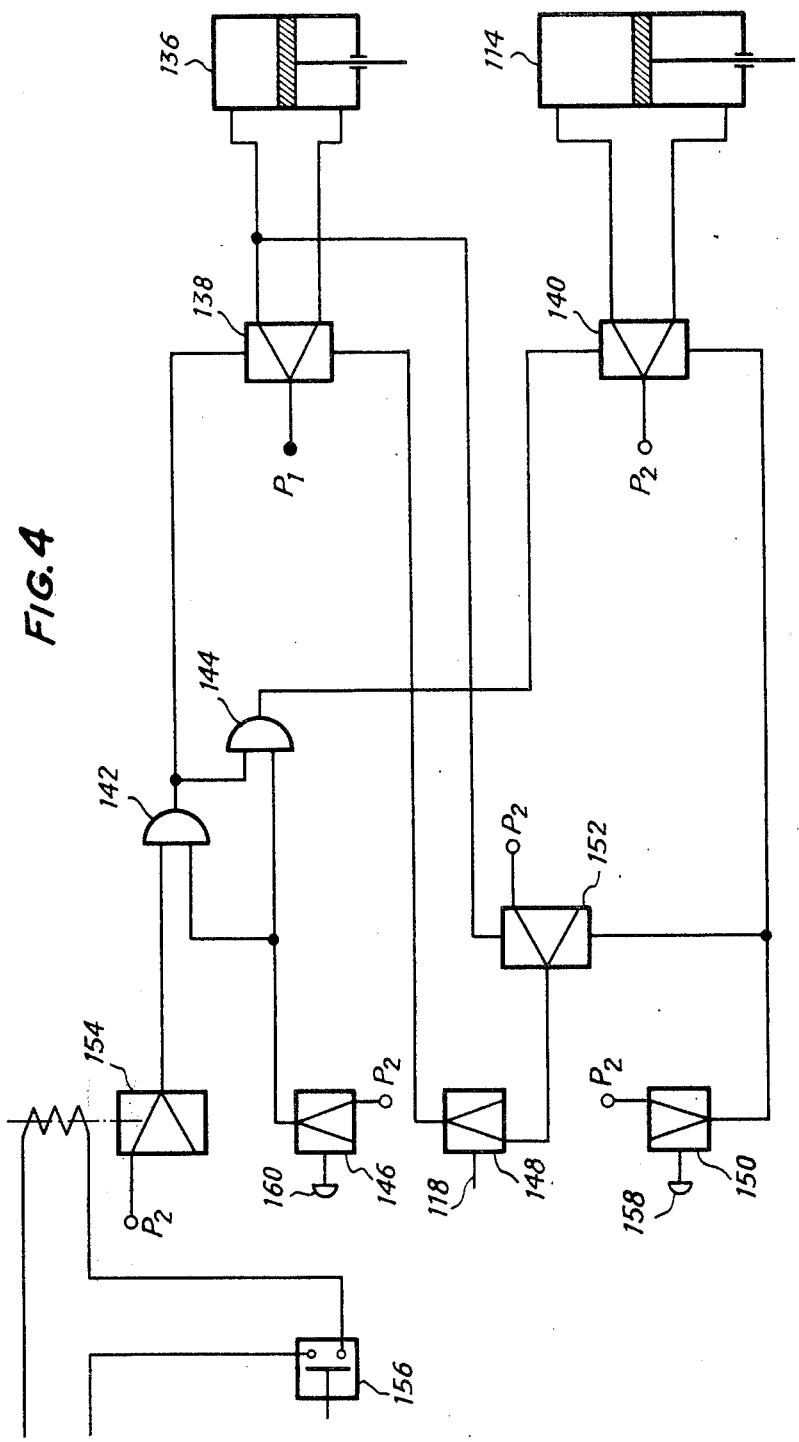
FIG. 4 illustrates the electropneumatic control circuit of the machine.

The electropneumatic system shown in FIG. 4 comprises:

two pneumatic distributors 138 and 140 connected respectively to the two chambers of the jacks 136 and 114;
two "OR" cells 142 and 144;
three microvalves 146, 148 and 150;
a memory relay 152;
an electrovalve 154;
an electrical microswitch 156;
connecting lines between the aforementioned elements; and
means for supplying compressed air (not shown).

As can be seen from FIG. 4, the distributor 140, the microvalves 146 and 150, the memory relay 152 and the electrovalve 154 are fed with air under a pressure $P_2$, whilst the distributor 138 is fed with air under a pressure $P_1$ lower than $P_2$.

The working cycle of the machine is as follows:

The cycle is initiated by depressing the pushbutton 158 of the microvalve 150 which opens the passage towards the memory relay 152 and towards the distributor 140. The jack 114 is then actuated and the translation unit brought into operation (rapid advance). During the rapid advance movement, the stops 116 and 120 (FIG. 2) come into contact and the contactor 118 is actuated. The advance movement continues, but more slowly under the effect of the braking force applied by the opposing hydraulic damper. The contactor 118 which, in effect, is the control stem of the microvalve 148 simultaneously actuates the distributor 138 and the relay 152 which closes the passage towards the microvalve 148. The contact movement then begins, whilst the advance movement continues at a low speed.

During the low-speed advance movement, the punch 126 comes into contact with the roller 132, causing the arm 134 to be lowered downwards (FIG. 2). The arm 134 then closes a contact, namely the microswitch 156.

The microswitch then energises the electrovalve 154 which actuates the distributor 138 through the cell 142, causing the jack to be withdrawn (contact movement in the opposite direction. The electrovalve 154 simultaneously actuates the distributor 140 through the cell 144, producing the advance movement in the opposite direction so that the advance unit returns to the position which it occupied at the beginning of the working cycle.

The working cycle may be interrupted at any stage to return to the starting position by actuating the pushbutton 160 of the microvalve 146. In this way, a signal is transmitted through the cells 142 and 144, causing the jacks 136 and 114 to be withdrawn.

By adjusting the position of the stop 116, it is possible as required to vary the beginning of the low-speed advance movement and, simultaneously, the beginning of the contact movement in dependence upon the size of the pattern and of the lens.

Similarly, it is possible by adjusting the position of the punch 126 to vary the simultaneous completion of the advance and contact movements as required. The centre-punch is preferably adjusted to stop the completion of the two movements when the contact of the grinding wheel and of the feeler is made respectively at the centre of the lens and at the centre of the pattern.

In the case of a circular lens and pattern, it is possible in this way to obtain progressive roughing-out of the lens from the outside towards the centre, the low-speed advance path corresponding to the size of the radius. It is of course possible to establish the low-speed advance path on a diameter by modifying the adjustment of the position of the centre-punch 126.

The reproduction machine according to the invention is particularly, but by no means exclusively, intended for roughing out glass or ceramic components having a toroidal surface, especially lenses for spectacles.

The invention is by no means confined to the embodiment of the machine described in the foregoing, so that any obvious modifications to the design of the machine also falls within the spirit and scope of the invention.

I claim:

1. In a machine for reproducing an article from a pattern, the machine comprising a drive means, a pair of parallel supporting shafts adapted to be driven at the same rotational speed by said drive means for supporting said article and said pattern respectively, a tool and a feeler adapted to make contact with said article and said pattern respectively and arranged in a constant spacial relationship equal to the interval between said article and said pattern, the improvement comprising: said tool and said feeler being fixed and a table on which said supporting shafts are mounted, said table being capable of making an advance movement in a direction perpendicular to said supporting shafts and a contact movement in a direction parallel to said supporting shafts; the axes of rotation of said supporting shafts being in a common plane and the direction of said advancement movement of said table being parallel to the plane formed by said supporting shafts; there being provided a pneumatic advance unit on said table, and a plate mounted on said pneumatic advance unit displaceable in the direction of said contact movement, said plate supporting said supporting shafts in said drive means; and there being provided a jack for producing said advance movement of said pneumatic unit which is capable of a rapid movement and an opposing hydraulic damper capable of braking said jack to produce a slow movement.

2. The improvement according to claim 1, comprising a jack for producing said contact and wherein said advance movement jack and said contact movement jack are each double acting.

3. In a machine for reproducing an article from a pattern, the machine comprising a drive means, a pair of parallel supporting shafts adapted to be driven at the same continuous rotational speed by said drive means for supporting said article and said pattern respectively, a tool and a feeler for contacting said article and said pattern respectively and arranged in a constant spacial relationship equal to the interval between said article and said pattern, the improvement comprising said tool and said feeler being fixed and a table on which said supporting shafts are mounted, said table being capable of making an advance movement in a direction perpendicular to said supporting shafts and a contact movement in a direction parallel to said supporting shafts, said machine further including a motor, wherein said tool and said feeler are in the form of discs of the same diameter rotatable about parallel, fixed axes of rotation, said tool being driven by said motor and said feeler rotating freely about its axis, and wherein the axes of rotation of said tool and said feeler are perpendicular to said supporting shafts.

* * * * *